James L. Plimpton's
Impt. in Skates.

Sheet No. 1.
2 Sheets.

4293

REISSUED MAR 7 1871

Witnesses
Andrew J. Van Cleve
P. Kynoch

Inventor
James L. Plimpton

THE NORRIS PETERS CO., WASHINGTON, D. C.

James L. Plimpton's
Impt in Skates.

Sheet No. 2.

Witnesses
Andrew B. Van Loan
P. Shymoch

Inventor:
James L. Plimpton

THE NORRIS PETERS CO., WASHINGTON, D. C.

United States Patent Office.

JAMES L. PLIMPTON, OF NEW YORK, N. Y.

DIVISION B.

Letters Patent No. 37,305, dated January 6, 1863; reissue No. 3,906, dated April 5, 1870; reissue No. 4,293, dated March 7, 1871.

IMPROVEMENT IN SKATES.

The Schedule referred to in these Letters Patent and making part of the same.

*To all whom it may concern:*

Be it known that I, JAMES L. PLIMPTON, of the city, county, and State of New York, have invented a new and improved Skate-Fastening; and I do hereby declare that the following is a full, clear, and exact description of the same, reference being had to the accompanying drawing making a part of this specification, in which—

Similar letters of reference indicate corresponding parts in the several figures.

This invention relates to an improved fastening for securing the fore part of the skate to the boot or shoe.

To enable those skilled in the art to fully understand and construct my invention, I will proceed to describe it.

In the upper surface of the stock or foot-stand A of a skate there is made transversely a groove or recess, *d*, over which a metal plate, G, is secured.

This plate is bent downward and inward at its ends, so as to extend a short distance underneath the stock or foot-stand A, and the plate G has a slot, *e*, made in each side of it, through each of which a plate, H, passes into a space between the bottom of the recess *d* and the plate G.

Figure 2:
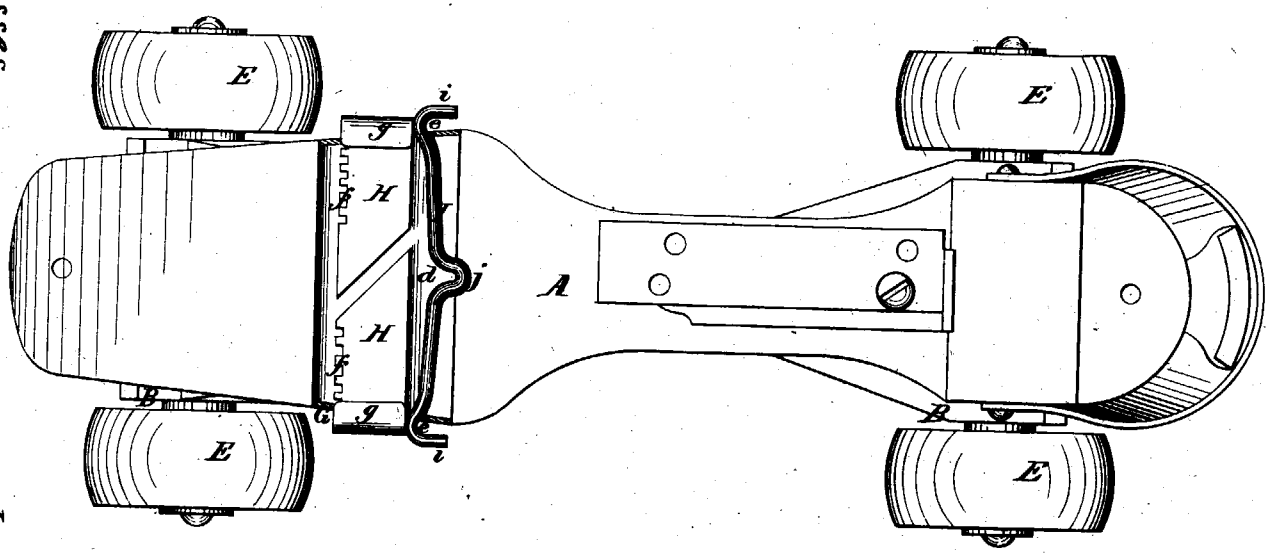
Figure 2 is a plan or top view of the same.

The plates H H have each a rack, *f*, formed at the front edges, as shown clearly in fig. 2.

Each plate H is curved upward and inward at its outer end, so as to form a hook, *g*, to catch over the edge *h* of the sole of the boot or shoe.

In the recess *d*, directly behind the plates H, there is placed a spring, I, which is formed of a single piece of wire bent backward at its ends, as shown at *i i*, and also bent at its center to form a horizontal projection, as shown at *j* in fig. 2.

This wire at its ends bears against the back edges of the plates H H, and keeps the racks *f* at the front edge of said plates engaged with the front edges of the slots *e*.

The plates H H are thereby retained in proper position, or prevented from being forced out laterally from the stock or foot-stand A.

In order to release the plates H H that they may be adjusted to the width of the sole, the ends of the spring I are bent down, so as to enter small vertical jogs or notches K at the back ends of the slots *e*, (see fig. 1,) and thereby be free from the plates H, so that the latter may be pressed backward in the recess *d*, and the rack *f* be free from the front edges of the slots *e*. This adjustment of the wire or spring I is shown in red in fig. 1.

Figure 1:
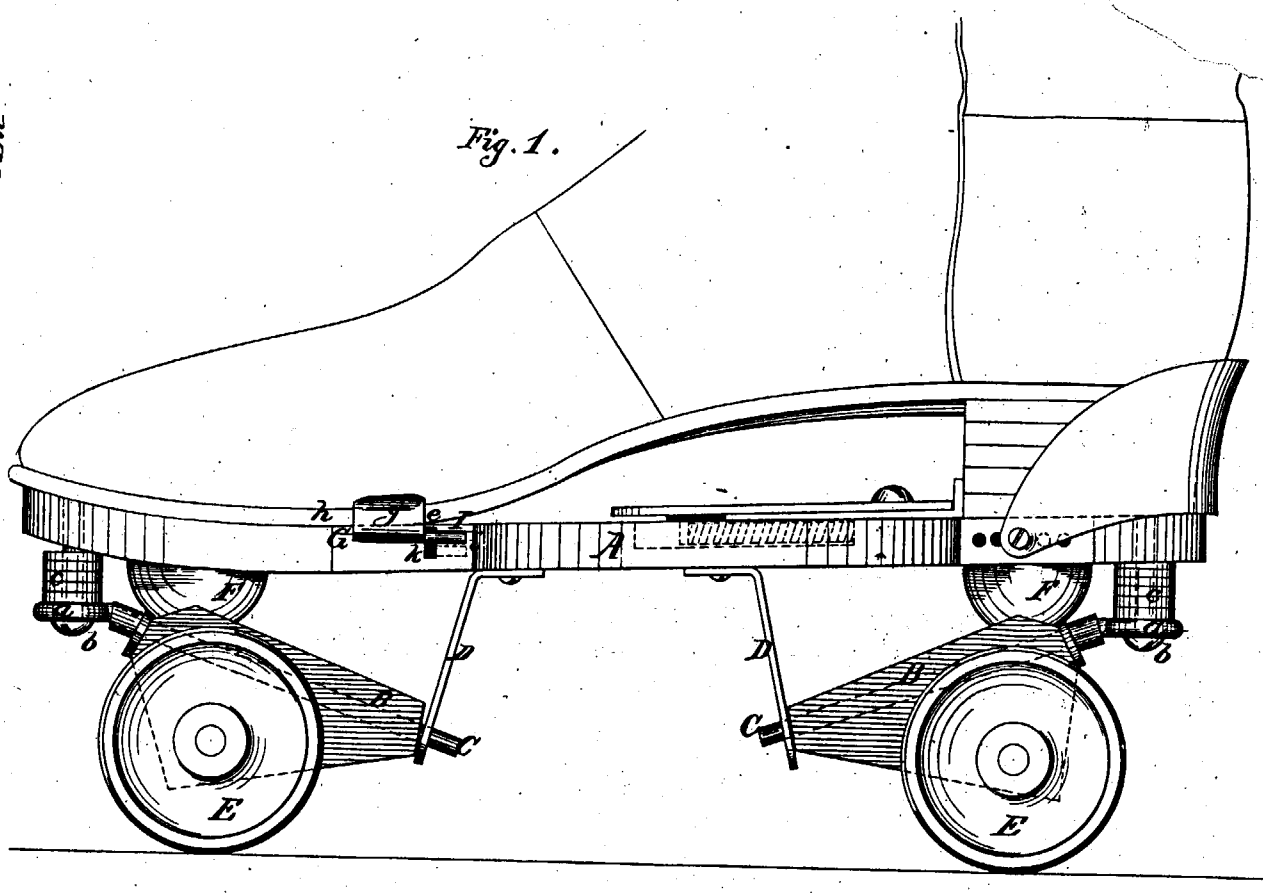
Figure 1 is a side view of a skate with my improved fastening.

Any proper heel-fastening may be used. The one represented in drawing, figs. 1 and 2, is substantially the same as that patented by me March 4, 1862.

Having thus described my invention,

What I claim as new, and desire to secure by Letters Patent, is—

The plates H H, provided with hooks *g* at their ends, and racks *f* at their front edges, in combination with the spring I and plates G, the latter being applied to the stock or foot-stand A, and provided with slots *e* at their ends, and all arranged, as shown, to form a fastening at the front part of the skate, as herein shown and described.

JAMES L. PLIMPTON.

Witnesses:
W. H. McCLURE,
JOHN DUFFY.